US009134521B2

(12) United States Patent
Huisken

(10) Patent No.: US 9,134,521 B2
(45) Date of Patent: Sep. 15, 2015

(54) MULTIDIRECTIONAL SELECTIVE PLANE ILLUMINATION MICROSCOPY

(75) Inventor: Jan Huisken, Dresden (DE)

(73) Assignee: The Regents of the University of California, Oakland, CA (US)

( * ) Notice: Subject to any disclaimer, the term of this patent is extended or adjusted under 35 U.S.C. 154(b) by 297 days.

(21) Appl. No.: 12/737,546

(22) PCT Filed: Jul. 29, 2009

(86) PCT No.: PCT/US2009/004412
§ 371 (c)(1),
(2), (4) Date: Jan. 21, 2011

(87) PCT Pub. No.: WO2010/014244
PCT Pub. Date: Feb. 4, 2010

(65) Prior Publication Data
US 2011/0115895 A1 May 19, 2011

Related U.S. Application Data

(60) Provisional application No. 61/137,501, filed on Jul. 30, 2008.

(51) Int. Cl.
*G02B 21/06* (2006.01)
*G02B 21/00* (2006.01)
(52) U.S. Cl.
CPC .............. *G02B 21/06* (2013.01); *G02B 21/008* (2013.01); *G02B 21/0048* (2013.01)
(58) Field of Classification Search
USPC ................................ 348/79; 356/73; 359/386
IPC ......................................................... G02B 21/06
See application file for complete search history.

(56) References Cited

U.S. PATENT DOCUMENTS

| 3,547,512 | A | 12/1970 | Baer |
| 5,903,781 | A | 5/1999 | Huber |
| 6,754,003 | B2 | 6/2004 | Engelhardt |
| 7,787,179 | B2 | 8/2010 | Lippert |
| 2004/0116811 | A1* | 6/2004 | Koschmieder ................ 600/452 |

(Continued)

OTHER PUBLICATIONS

Huisken, J. et al. Even Fluorescence Excitation by Multidirectional Selective Plane Illumination Microscopy. Optics Letters, Sep. 1, 2007, vol. 32, No. 17, pp. 2608-2610.*

(Continued)

*Primary Examiner* — Jay Patel
*Assistant Examiner* — Neil Mikeska
(74) *Attorney, Agent, or Firm* — Lumen Patent Firm

(57) ABSTRACT

A method and device for multi-directional selective plane illumination microscopy is provided. A detector focal plane is alternately illuminated with at least two counter-propagating, coplanar light sheets, and an image of a specimen cross-section positioned in the focal plane is detected while only one light sheet illuminates the specimen. The wavefront of the illumination beams may be deformed with adaptive optics using feedback from light transmitted through the specimen. Multiple images of the specimen cross-section may be detected at different times and specimen positions and orientations to produce multi-view image stacks which may be processed using image fusion to produce a reconstructed image representation of the specimen. Additionally, the direction of propagation of the alternating light sheets may be pivoted in the focal plane while detecting the image.

15 Claims, 11 Drawing Sheets

(56) References Cited

U.S. PATENT DOCUMENTS

| | | | |
|---|---|---|---|
| 2006/0012855 | A1 | 1/2006 | Wolleschensky |
| 2006/0033987 | A1 | 2/2006 | Stelzer et al. |
| 2007/0109633 | A1 | 5/2007 | Stelzer |
| 2007/0146873 | A1* | 6/2007 | Ortyn et al. ............ 359/386 |
| 2008/0030850 | A1 | 2/2008 | Wolleschensky |
| 2008/0204724 | A1* | 8/2008 | Hamamatsu et al. ........ 356/73 |
| 2012/0307037 | A1* | 12/2012 | Holy et al. ............ 348/79 |

OTHER PUBLICATIONS

Swoger et al., Multi-view image fusion improves resolution in three-dimensional microscopy, Jun. 25, 2007, pp. 8029-8042, vol. 15, No. 13, Optics Express.

Huisken et al., Even fluorescence excitation by multidirectional selective plane illumination microscopy (mSPIM), Sep. 1, 2007, pp. 2608-2610, vol. 32, No. 7, Optics Letters.

Swoger et al., Multiple imaging axis microscopy improves resolution for thick-sample applications, Sep. 15, 2003, pp. 1654-1656, vol. 28, No. 18, Optics Letters.

Huisken et al. Optical Sectioning Deep Inside Live Embryos by Selective Plane Illumination Microscopy. Science Aug. 13, 2004 305:1007-1025.

Huisken et al. Even fluorescence excitation by multidirectional selective plane illumination microscopy (mSPIM). Optics Letters / vol. 32, No. 17:2608-2610, Sep. 1, 2007.

Engelbrecht et al. Resolution enhancement in a light-sheet-based microscope (SPIM). Optics Letters / vol. 31, No. 10:1477-1479, May 15, 2006.

* cited by examiner

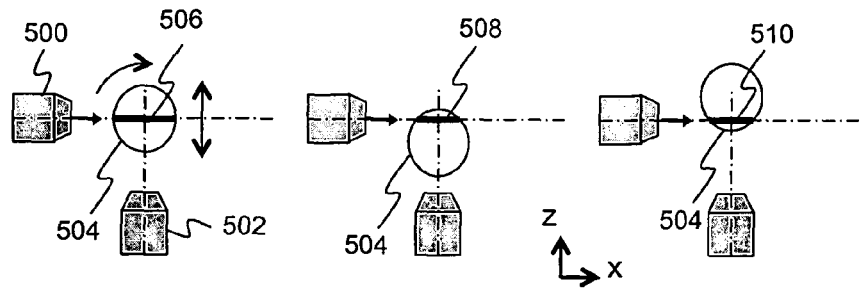
*Fig. 5A*  *Fig. 5B*  *Fig. 5C*
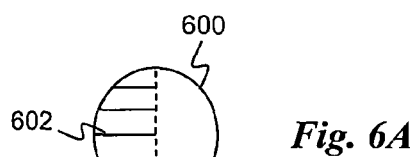
*Fig. 6A*
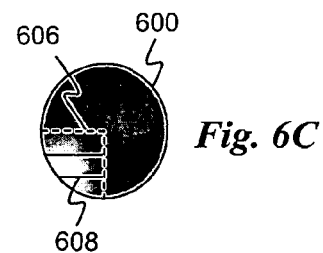
*Fig. 6C*
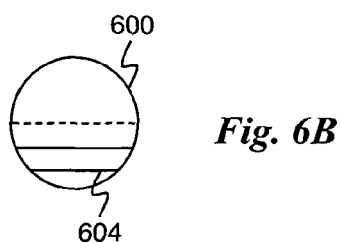
*Fig. 6B*
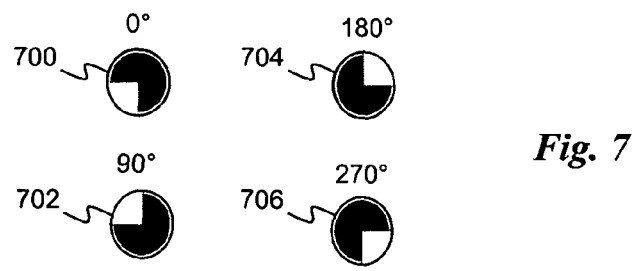
*Fig. 7*

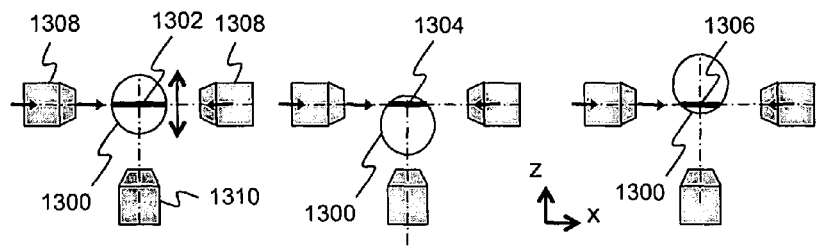
*Fig. 13A*  *Fig. 13B*  *Fig. 13C*
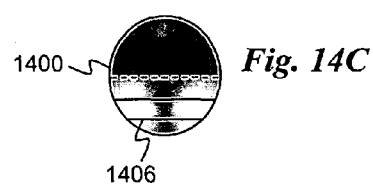
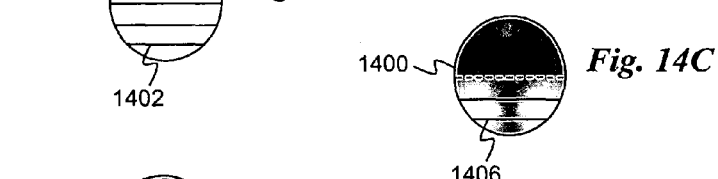
*Fig. 15*
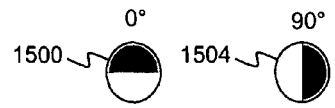
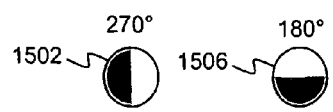

MULTIDIRECTIONAL SELECTIVE PLANE ILLUMINATION MICROSCOPY

CROSS-REFERENCE TO RELATED APPLICATIONS

This application is a national stage filing of PCT Patent Application PCT/US2009/004412 filed Jul. 29, 2009, which claims priority from U.S. Provisional Patent Application 61/137,501 filed Jul. 30, 2008, both of which are incorporated herein by reference.

STATEMENT OF GOVERNMENT SPONSORED SUPPORT

This invention was made with Government support under contracts 5ROIHL54737 and 2ROIDK60322 awarded by The National Institutes of Health. The Government has certain rights in this invention.

FIELD OF THE INVENTION

The present invention relates generally to optical microscopy. More specifically, it relates to improved methods and devices for selective plane illumination microscopy.

BACKGROUND OF THE INVENTION

In conventional microscopic imaging of three-dimensional extended specimens, out-of-focus light can degrade the image. Consequently, techniques for optical sectioning have been developed to reject out-of-focus light. In selective plane illumination microscopy (SPIM), a sheet of light 100 generated by illumination optics 108 illuminates a cross-section of a specimen positioned within the focal plane 102 of an detection optics 112 of an imaging microscope, i.e., the illumination is from the side, along an illumination axis 104 at a right angle to the detection axis 106, as shown in FIG. 1 and described in US 20060033987. The optical sectioning improves image quality and reduces photo-damage to the specimen and permits imaging of living specimens. In addition, by rotation and translation of the specimen, different cross-sectional images may be collected and combined using multi-view image processing.

Unfortunately, conventional SPIM image quality can suffer from various effects of the illumination and imaging techniques. In particular, the orthogonal illumination can produce high-contrast shadow artifacts in the images. Also, the attenuation and scattering of the excitation light in the specimen results in progressive image degradation as the light propagates through the specimen. These problems, in turn, adversely impact multi-view image processing. US 20070109633 provides two oppositely-directed coaxial illumination beams which address some of the attenuation problems. However, simultaneous illumination by multiple counter-propagating beams produces out-of-focus light due to scattering. The approach also does not address the other problems with conventional SPIM. Therefore, it would be an advance in the art to provide an improved SPIM technique and apparatus that overcomes these problems and improves image quality.

SUMMARY OF THE INVENTION

According to one aspect, an improved SPIM microscope is provided. The microscope includes a laser unit producing a light beam and a beam path switcher alternately directing the light beam along two distinct paths producing two alternating light beams. The microscope also includes two illumination units producing from the two alternating light beams two respective counter-propagating, coplanar, alternating light sheets. A detection unit of the microscope is focused on a focal plane. The focal plane is alternately illuminated by the two light sheets from opposite directions.

In one embodiment, the microscope also has a scan unit with a resonant mirror producing from the light beam a light beam having an oscillating path. The oscillating path causes a pivot through the focal plane of the alternating light sheets at angles determined by the resonant mirror. The microscope preferably includes an image processor that produces fused image data from images detected by the detection unit using image fusion processing.

According to another aspect, a method for selective plane illumination microscopy is provided. The method includes alternately illuminating a focal plane with two counter-propagating, coplanar light sheets such that the focal plane is illuminated by only one light sheet at a time. Additionally, while at least one of the coplanar light sheets is illuminating the focal plane, an image of a specimen cross-section positioned in the focal plane is detected. Multiple images of the specimen cross-section detected while at least one of the coplanar light sheets is illuminating the focal plane are processed using image fusion to produce a reconstructed image representation of the specimen. In one embodiment, the method may also include alternately illuminating the focal plane with an additional pair of two counter-propagating, coplanar light sheets such that the focal plane is illuminated by only one light sheet at a time.

Preferably, embodiments of the method also include pivoting the direction of propagation of the light sheets in the focal plane while detecting the image. The pivoting preferably oscillates at a frequency on the order of 1 kHz through +/−10 degrees while detecting the image.

In another aspect, adaptive optics are used to adapt the light sheets using feedback from light transmitted through the specimen. Each of the illumination units may include adaptive optics, an optical detector, and a feedback system for adapting opposing light beams to improve imaging through the sample.

BRIEF DESCRIPTION OF THE DRAWINGS

FIGS. 5A-C illustrate the translation of a specimen to produce a stack of images using conventional SPIM.

FIGS. 6A-C show image stacks of a specimen illuminated from just one side using conventional SPIM, illustrating how limited well-illuminated regions and limited well-detected regions intersect and result in limited well-imaged regions.

FIG. 7 is a schematic illustration of four rotational orientations of a specimen illuminated from just one side using conventional SPIM, illustrating four non-overlapping well-imaged regions.

FIGS. 13A-C show a specimen being translated to three different positions in the z direction to produce three corresponding images that form part of an image stack.

FIGS. 14A-C show image stacks of a specimen illuminated from two sides, illustrating how well-illuminated regions and well-detected regions intersect and result in well-imaged regions.

FIG. 15 is a schematic illustration of four rotational orientations of a specimen illuminated from two sides, illustrating four overlapping well-imaged regions.

DETAILED DESCRIPTION

Figure 1:
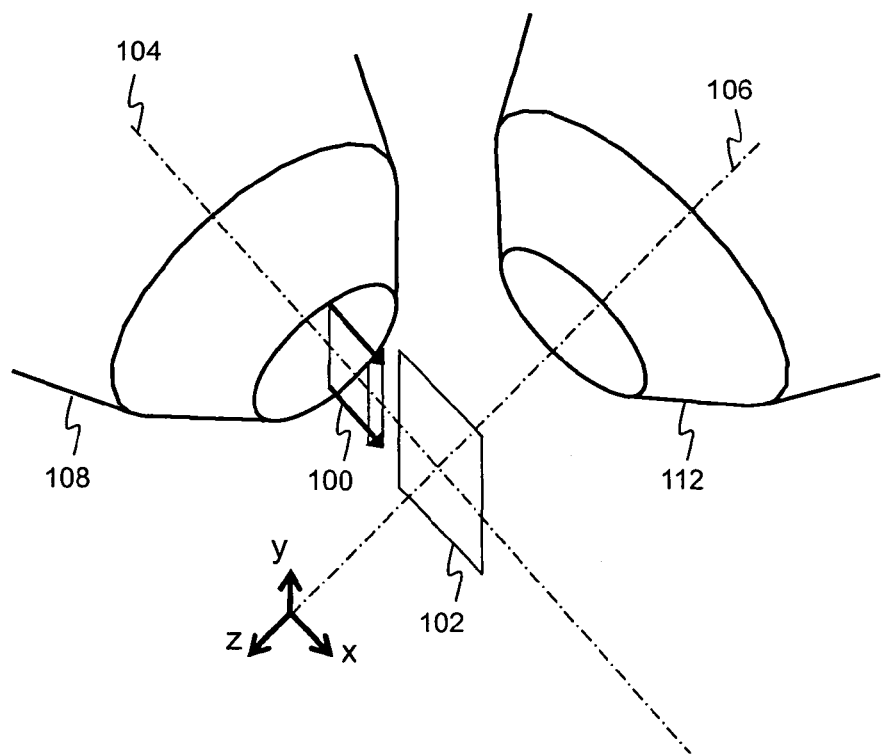
FIG. 1 is a perspective view of detection and illumination optics of a conventional SPIM device showing a single light sheet illuminating the focal plane of detection optics from one side.

The innovations of the present invention may be appreciated by first considering in more detail conventional SPIM. Although SPIM provides improved microscopy through the use of optical sectioning, there are several undesirable side-effects of the conventional optical sectioning technique. As shown in FIG. 1, a single light sheet is focused by illumination optics so that it illuminates the focal plane of detection optics (i.e., the x-y plane). The light sheet propagates along an illumination axis (x-axis) perpendicular to the detection axis (z-axis).

Figure 2:
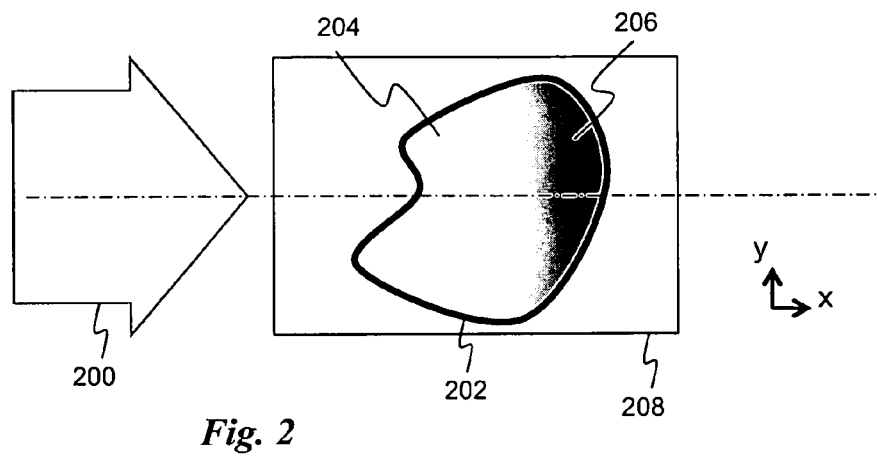
FIG. 2 is a schematic view illustrating the absorption of an illuminating light sheet as it propagates through a specimen from one side.
Figure 3A:
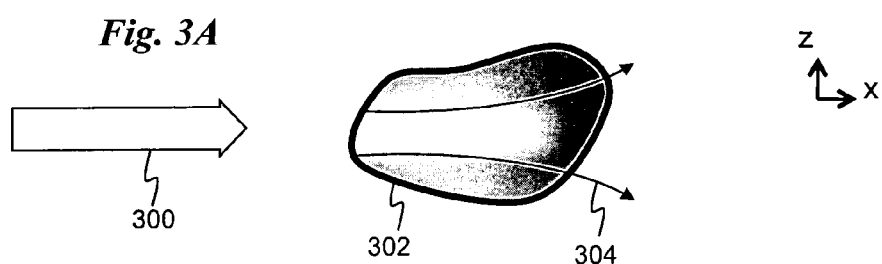
FIGS. 3A-B are schematic views of the absorption illustrated in FIG. 2 showing the out-of-plane scattering of light as it propagates through a specimen.
Figure 3B:
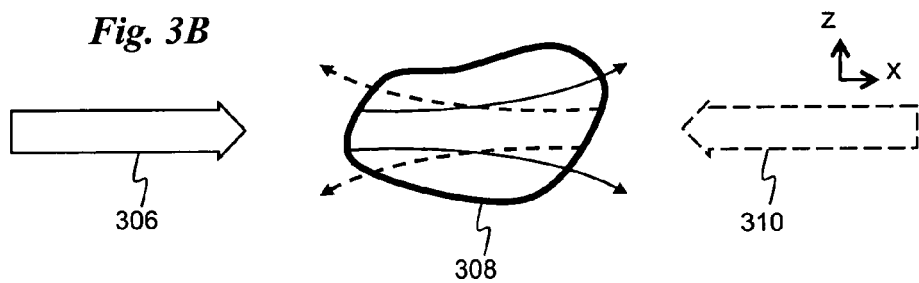

One problem that arises in conventional SPIM is related to the absorption, as shown in FIG. 2. In particular, absorption of the illuminating light sheet 200 as it propagates through the specimen 202 causes only one side 204 of the specimen in the focal plane 208 to be well-illuminated: the side facing the illumination lens. The other side 206 is poorly illuminated. Consequently, the part of the detected image opposite to the illumination lens in the focal plane may have low quality, especially if the specimen is relatively opaque. Although the degree of degradation may vary, in the following description we will consider a typical case where approximately half the image is well illuminated and the other half is poorly illuminated. This holds true for many of the biological sample investigated using SPIM. Illuminating the specimen from opposite sides simultaneously can help mitigate these effects of absorption. However, simultaneous illumination from opposite sides introduces problems of its own due to scattering, as shown in FIGS. 3A and 3B. As the light sheet 300 propagates through the specimen 302, it may be scattered 304 by material in the specimen interacting with the light, as shown in FIG. 3A. Although scattering in the focal plane (x-y plane) does not reduce image quality, scattering in the z-direction produces a scattered light sheet with a larger thickness, reducing image quality due to increased out-of-focus illumination of the specimen. The amount of out-of-focus illumination is increased further when the specimen is illuminated simultaneously from both sides, as shown in FIG. 3B. The left light sheet 306 produces out-of-focus illumination of the right side of the specimen 308, while the right light sheet 310 produces out-of-focus illumination of the left side of the specimen. Simultaneous illumination degrades the image quality over single sided illumination.

Figure 4A:
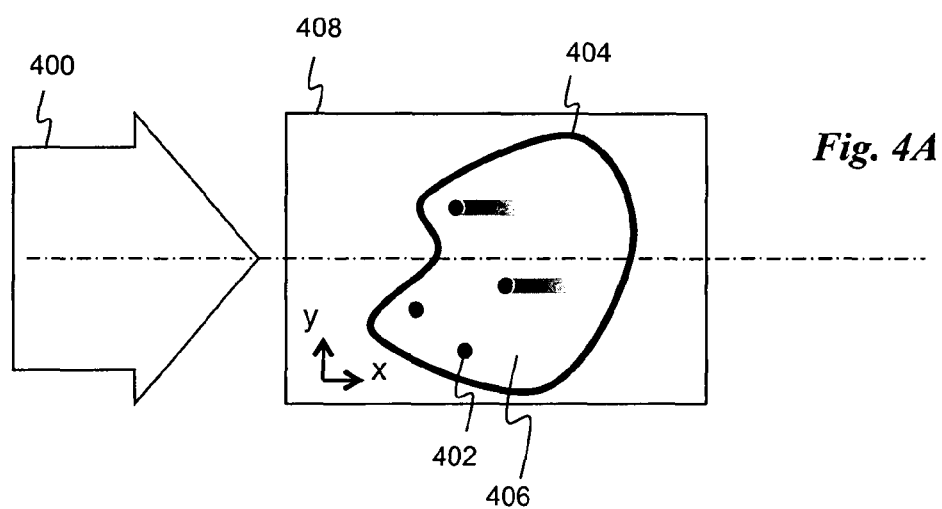
FIGS. 4A-B show two views of a light sheet passing through a specimen from one side, producing high contrast shadow artifacts.
Figure 4B:
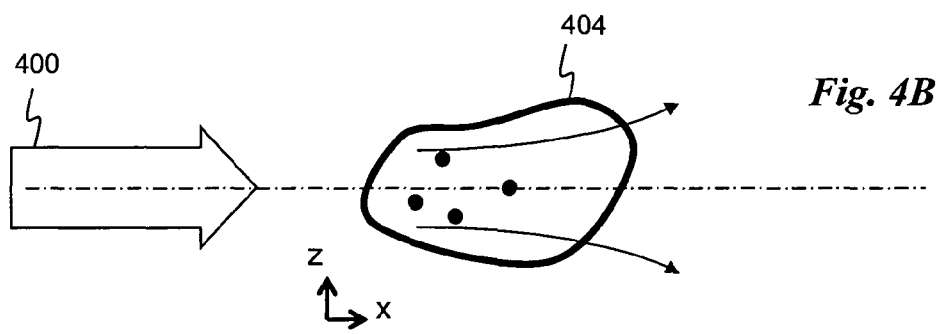

Conventional SPIM also suffers from high contrast shadow artifacts, as illustrated in FIGS. 4A and 4B. Due to the illumination by the light sheet 400 from the side, any pigment or inhomogeneity 402 in the specimen 404 that absorbs or scatters light casts a high-contrast shadow 406 in the focal plane 408. FIG. 4A illustrates this effect in the image plane (x-y plane), while FIG. 4B provides a side view (x-z plane). Because the shadows have high-contrast, they are significant image artifacts, even when multi-view image fusion techniques are used. The absorption and scattering effects also influence the results of multi-view image fusion.

FIGS. 5A-C illustrate the use of conventional SPIM having illumination optics 500 and detection optics 502 together with translation of the specimen 504 to produce a set of images, each corresponding to a specific translational position of the specimen in which a particular cross-section intersects the image plane 506. For example, FIG. 5A shows the acquisition of an image 506 in the center of the specimen 504. FIG. 5B shows the acquisition of an image 508 in the far side of the specimen 504 from the detector, and FIG. 5C shows the acquisition of an image 510 in the near side of the specimen 504. At each translational position, an image is acquired and stored, resulting in a stack of images providing a three-dimensional representation of the specimen. As discussed above in relation to FIG. 2, the left side of an image will be well-illuminated. Accordingly, FIG. 6A shows the left sides 600 of the image stack of specimen 602 being well-illuminated. For similar reasons, the images 604 in the stack closer to the detector will be well-detected, while the images farther from the detector will not be so well detected, as shown in FIG. 6B. Consequently, the well-imaged quadrant 606, shown in FIG. 6C, corresponds to the left sides of the images 608 closer to the detector. The other quadrants can be well-imaged by collecting image stacks at four different rotational positions 700, 702, 704, 706 (i.e., consecutive rotation by 90 degrees) of the specimen, as shown in FIG. 7. Multi-view image fusion techniques can then be used to construct a three-dimensional representation of the specimen from the image stacks. Image registration, however, can be problematic because the overlapping portions of the different views are not well-imaged.

Embodiments of the present invention provide improvements to conventional SPIM that overcome the problems discussed above. In one aspect, a multi-directional SPIM (mSPIM) technique alternatively illuminates the specimen from multiple directions. The resulting two images may be computationally fused yielding a superior image. Because the illumination is alternating rather than simultaneous, the image is well-illuminated from both sides and yet does not suffer from image degradation due to out-of-focus light. The image fusion process can be performed in the spatial domain when it is obvious which parts of the image are superior to the other image, e.g., in spherical objects the half facing the illumination is always well imaged. In more complex objects the fusion may involve methods like Fourier transformations to extract the high-resolution information from each image. In any case, the fusion algorithm will always provide a final image that is superior to any single image. The multiple directions of illumination are preferably two opposite directions along a common axis perpendicular to the detection axis. This technique improves image reconstruction using multi-view image fusion both because the image quality is improved and because there is larger well-imaged regions of overlap between the image stacks at different rotational positions of the sample. Since only half of the field of view needs to be illuminated with each one beam, the light sheets can be made thinner, and the axial resolution is thereby increased by $\sqrt{2}$ as compared to single-directional SPIM. The multidirectional illumination proves essential in biological specimens such as millimeter-sized embryos.

Embodiments of the invention may also include techniques to mitigate shadow artifacts. Specifically, the shadowing in the excitation path due to absorption in the specimen is eliminated by pivoting the incident angle of the light sheet at a high frequency. The resulting images recorded at different incident angles of illumination may be computationally fused yielding a superior image, or the pivoting may take place during a single camera exposure.

Figure 8:
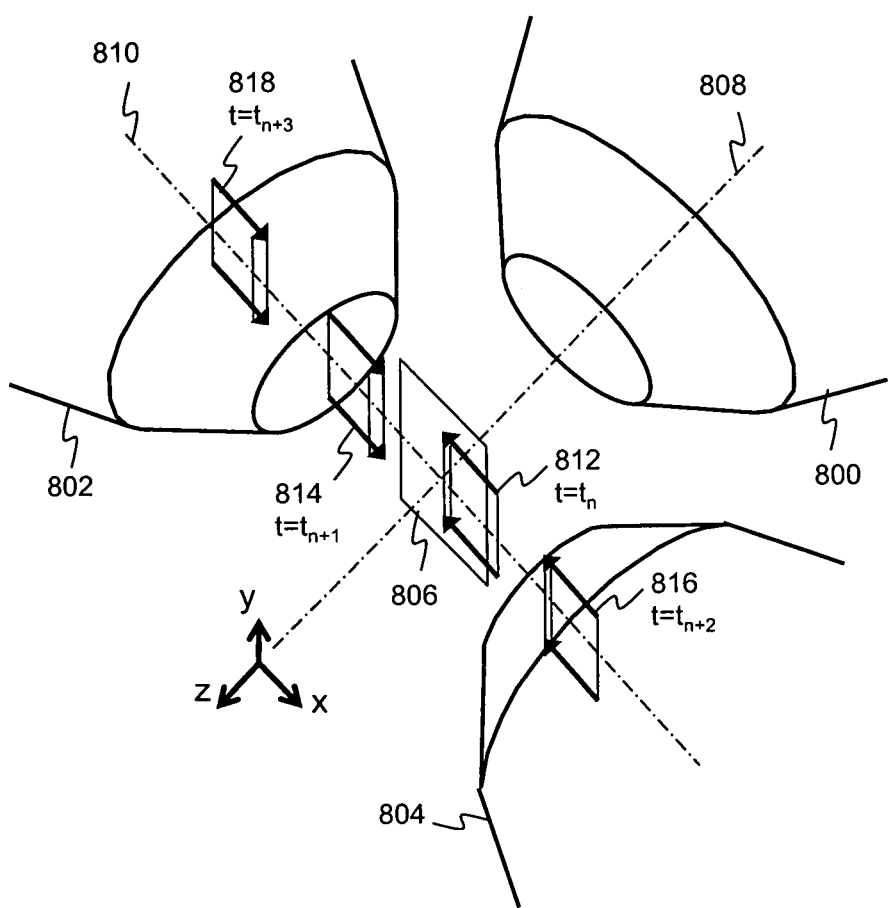
FIG. 8 is a perspective view of detection and illumination optics of a multi-directional SPIM (mSPIM) device showing two alternating light sheets illuminating the focal plane of detection optics from two opposite sides.

A preferred embodiment of the invention will now be described in detail to illustrate the principles and advantages of mSPIM technique. FIG. 8 is a perspective view of a portion of a mSPIM device which shows detection optics 800 aligned on detection axis 808 as well as both left illumination optics 802 and right illumination optics 804 aligned on illumination axis 810. Illumination optics 802 and 804 form the terminal portions of two respective illumination units. The detection optics shown are an initial portion of a detection unit of the microscope that is focused on the focal plane 806. The detection unit preferably includes a CCD and associated image storage and processing electronics. As with conventional SPIM, the illumination axis 810 is perpendicular to the detection axis 808. However, the mSPIM device shown has two illumination units rather than just one. Moreover, the two illumination units produce two respective counter-propagating, coplanar, alternating light sheets. These light sheet beams alternately illuminate the focal plane from opposite directions, i.e., they do not illuminate the focal plane simultaneously. The alternate illumination is illustrated in FIG. 8 by alternating sequences of light sheet pulses 812, 814, 816, 818 at discrete, evenly spaced time intervals $t=t_n$, $t=t_{n+1}$, $t=t_{n+2}$, $t=t_{n+3}$. The light sheet pulses alternate so that light sheet pulses from one side alternate with pulses from the opposite side. At any given time, the field of view in the focal plane 806 is illuminated by only one light sheet from one direction, thereby minimizing adverse out-of-focus effects of simultaneous illumination from multiple directions. Ideally the illumination is switched every time an image is recorded by the camera. This way the camera can be run at maximum speed, providing a trigger signal to switch illumination after every frame.

Figure 9A:
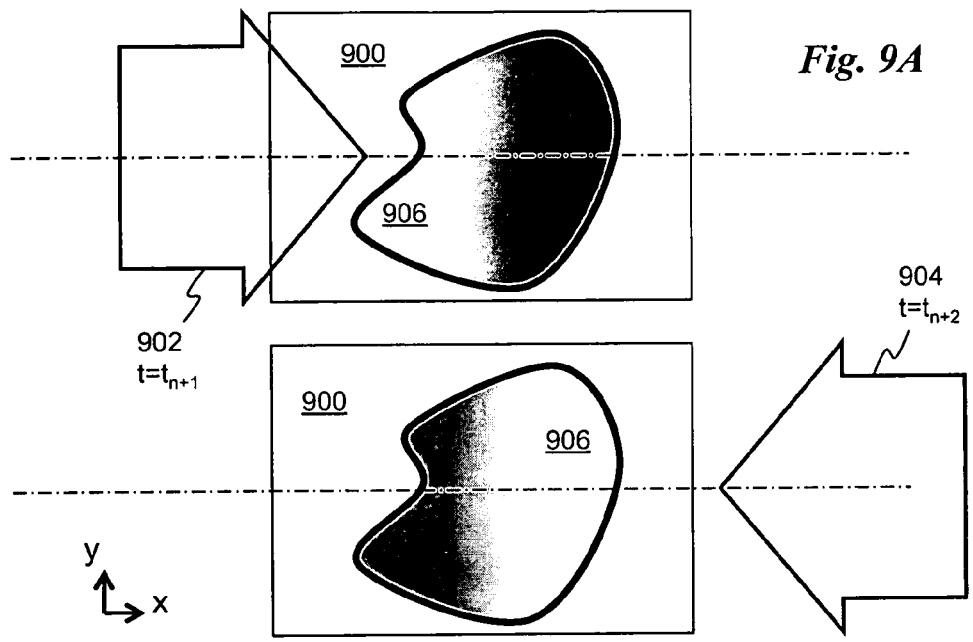
FIGS. 9A and 9B show two views, respectively, of counter-propagating light sheets alternately illuminating a specimen from opposite sides at two distinct time intervals.
Figure 9B:
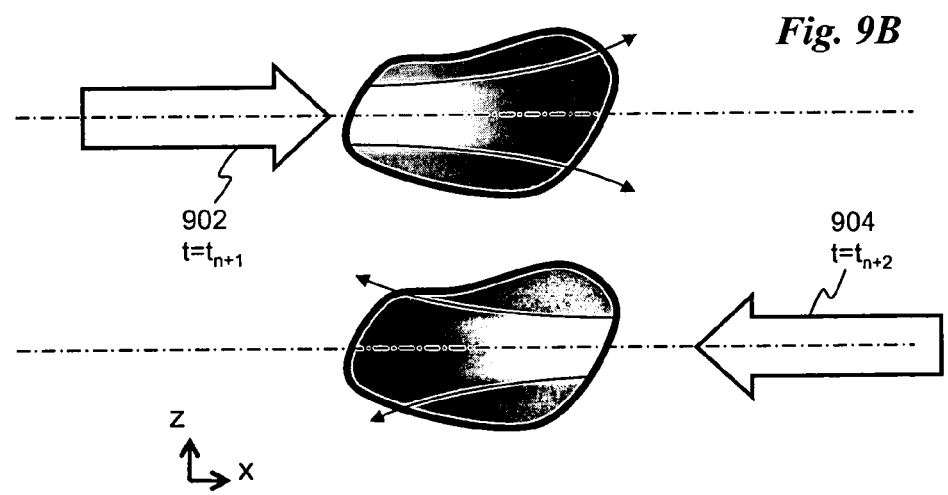

FIGS. 9A and 9B illustrate an advantage of alternate illumination by counter-propagating light sheets. FIG. 9A shows a view in the focal plane 900 of two light sheets 902, 904 illuminating the field of view at two alternate times $t=t_{n+1}$, and $t=t_{n+2}$. The cross-section of the specimen 906 in the focal plane 900 has one side illuminated by one light sheet pulse in time slot $t=t_{n+1}$, while the same cross-section has its opposite side illuminated by a counter-propagating light sheet pulse in a time slot $t=t_{n+2}$. FIG. 9B illustrates a side view of the same situation, showing that the scattering does not produce substantial out-of-focus light in the well-imaged half of the specimen. Preferably, an image is detected during each time slot, and then the two images may be combined using image fusion processing. In one embodiment, the two images may be limited to the well-illuminated half of the field of view, allowing for a faster frame rate and further limiting out-of-focus light.

Figure 10A:
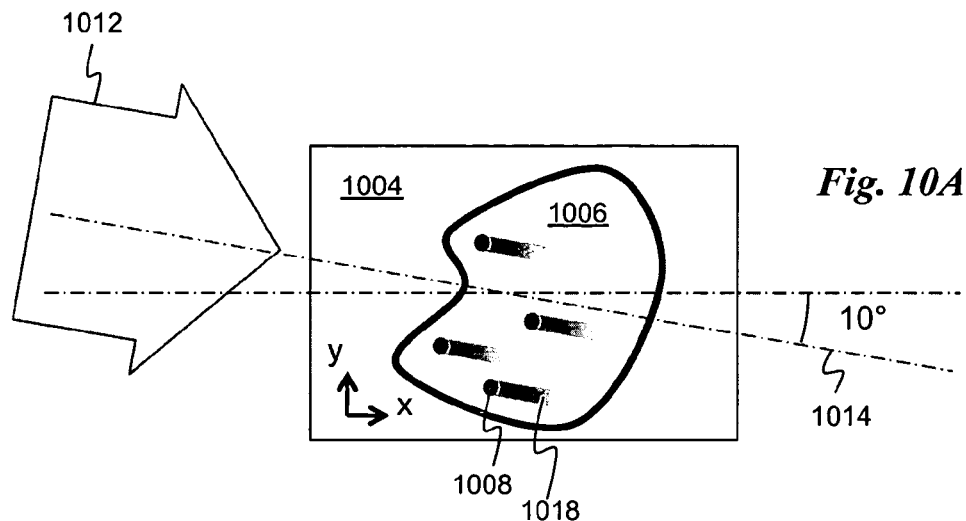
FIGS. 10A-C show a light sheet illuminating a specimen from three distinct directions of propagation, illustrating how a pivoting light sheet substantially reduces shadow artifacts in the images.
Figure 10B:
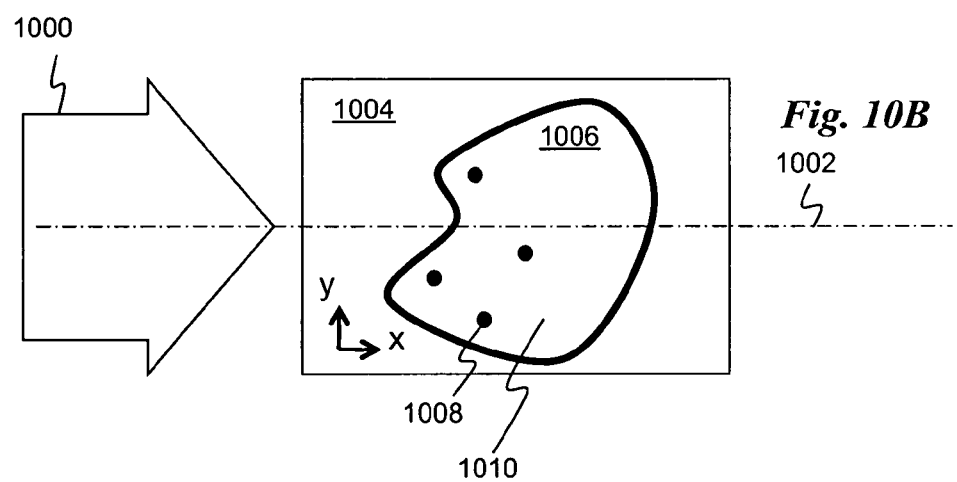
Figure 10C:
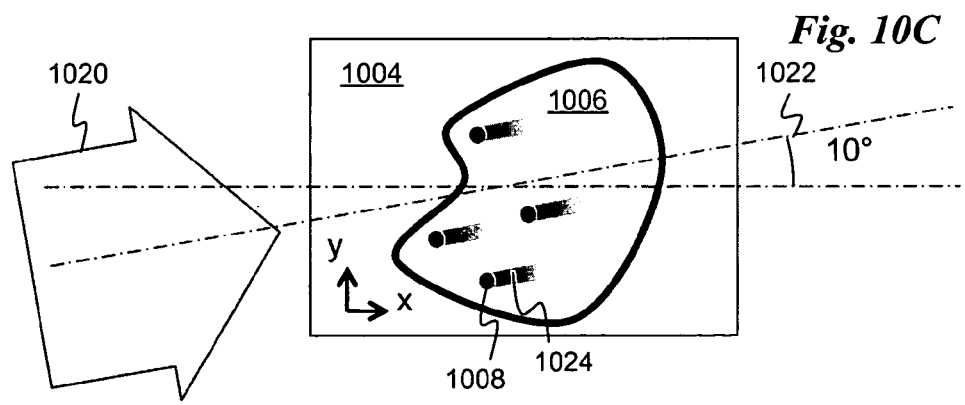

A preferred embodiment of the invention combines the technique of alternating counter-propagating illumination with the additional technique of light sheet pivoting. The pivoting technique, illustrated in FIGS. 10A-C, substantially reduces shadow artifacts in the images. FIG. 10B shows a stationary-aligned light sheet 1000 propagating along a stationary axis 1002 in the focal plane 1004 through a cross-section of the specimen 1006 located in the field of view of the detection optics. Inhomogeneities 1008 in the specimen cast shadows 1010 in the direction of propagation. FIG. 10A illustrates the same specimen illuminated by a pivoted light sheet 1012 propagating along a pivoted illumination axis 1014. The inhomogeneities 1008 in the specimen are imaged in the same positions but with pivoted shadows 1018 along the pivoted direction of propagation 1014. FIG. 10C illustrates the same specimen 1006 illuminated by a pivoted light sheet 1020 where the illumination axis 1022 is pivoted in an opposite angular direction than shown in FIG. 10B so that inhomogeneities 1008 produce pivoted shadows 1024. In one embodiment, the pivoting is performed at a sufficiently high frequency that the entire range of angles (e.g., +/−10 degrees) is spanned one or more times during a single CCD camera exposure period, e.g., for a camera exposure time of 10 ms the minimum scanning frequency needs to be 100 Hz.

Figure 11:
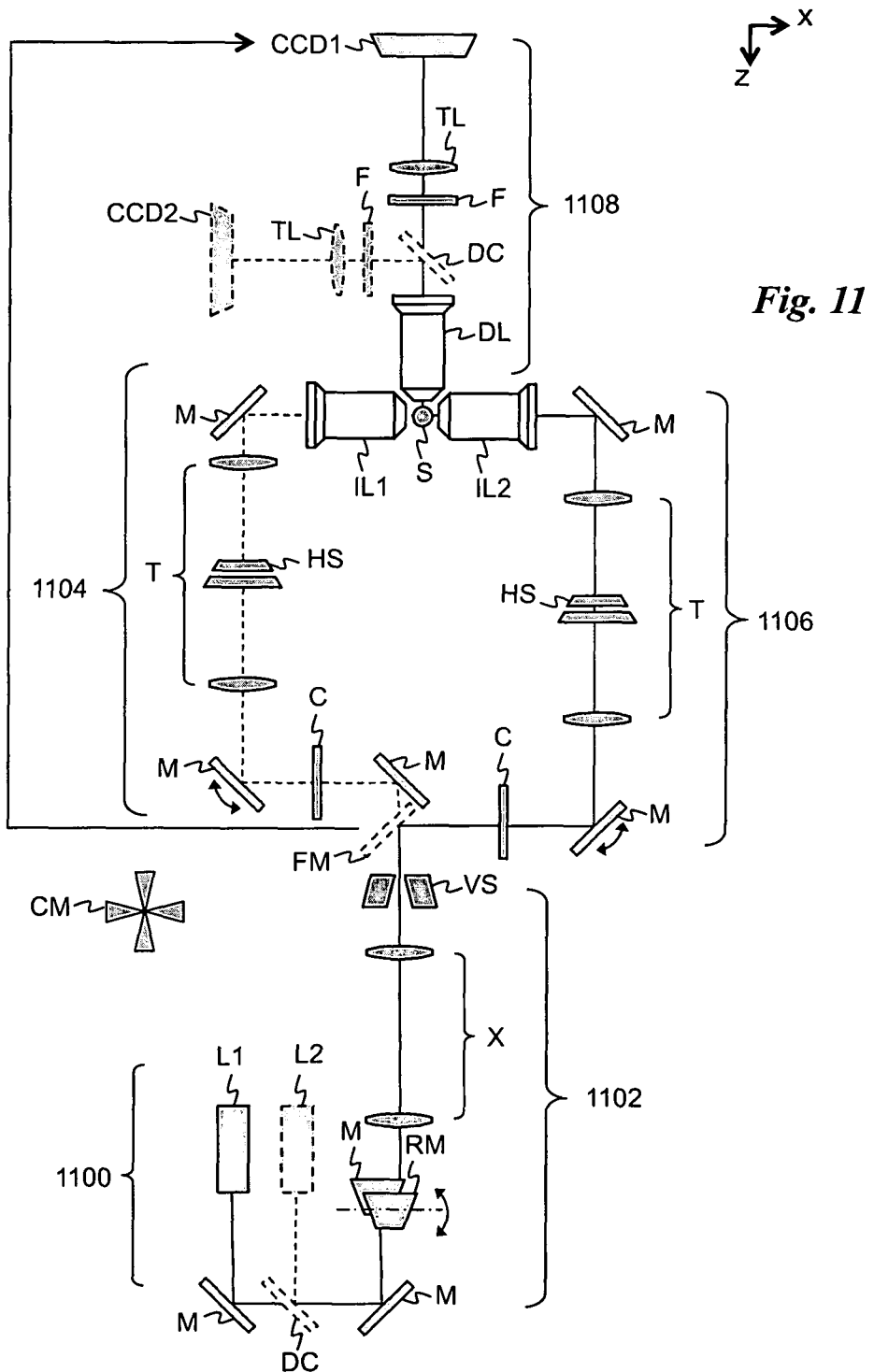
FIG. 11 is a schematic view of a multi-directional SPIM device according to one embodiment of the invention.

Those skilled in the art will appreciate that the techniques described above may be implemented using various optical devices. For example, one device implementing the techniques of invention is shown schematically in FIG. 11. The microscope device shown has a laser unit, a scan unit, two illumination units, and a detection unit. Additionally, the device may include, or be connected to, an appropriate image processing unit (not shown) for storing and post-processing the images.

The laser unit 1100 includes one or more lasers (L1, L2) producing light beam(s) which enter the scan unit 1102. The scan unit 1102 includes a resonant mirror (RM), an expansion telescope (X), a vertical slit (VS) to control the numerical aperture and the thickness of the light sheet, and a beam path switcher. The beam path switcher may be implemented using a scan mirror, a flip mirror (FM), or a rotating chopper mirror (CM). In either case, the beam path switcher alternately directs the light beam along two distinct paths, producing two alternating light beams which enter illumination units 1104 and 1106, respectively. The beam path switcher is synchronized with the detection unit 1108 so that the light beam pulses are properly synchronized with the exposure times of the detector (CCD1).

Figure 16:
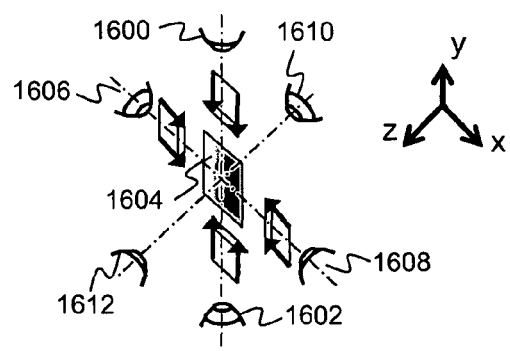
FIG. 16 illustrates aspects of an alternate embodiment of a multi-directional SPIM device that has an additional detector to capture images from opposite sides of the specimen and/or an additional pair of illumination units so that the specimen is illuminated from four sides.

In an alternate embodiment, as shown in FIG. 16, there may be an additional pair of illumination units 1600, 1602 positioned in the x-y plane that directs two additional counter-propagating light sheets into the focal plane 1604 from different orientations than the original illumination optics 1606, 1608, so that the specimen is illuminated from more sides than two. For example, there may be one additional pair of illumination units whose shared illumination axis is parallel to the y axis. In this case, the beam path switcher implementation is more complex, directing the beam sequentially between four distinct paths rather than alternating between two. For example, the beam path switcher could be implemented by a cascaded arrangement of three flip mirrors or rotating chopper mirrors. Those skilled in the art will appreciate that additional illumination units may be added and need not be added in coaxial pairs. Generally, any number of units may be used to provide any multiplicity of light sheets directed at the specimen along a multiplicity of illumination axes.

Figure 12:
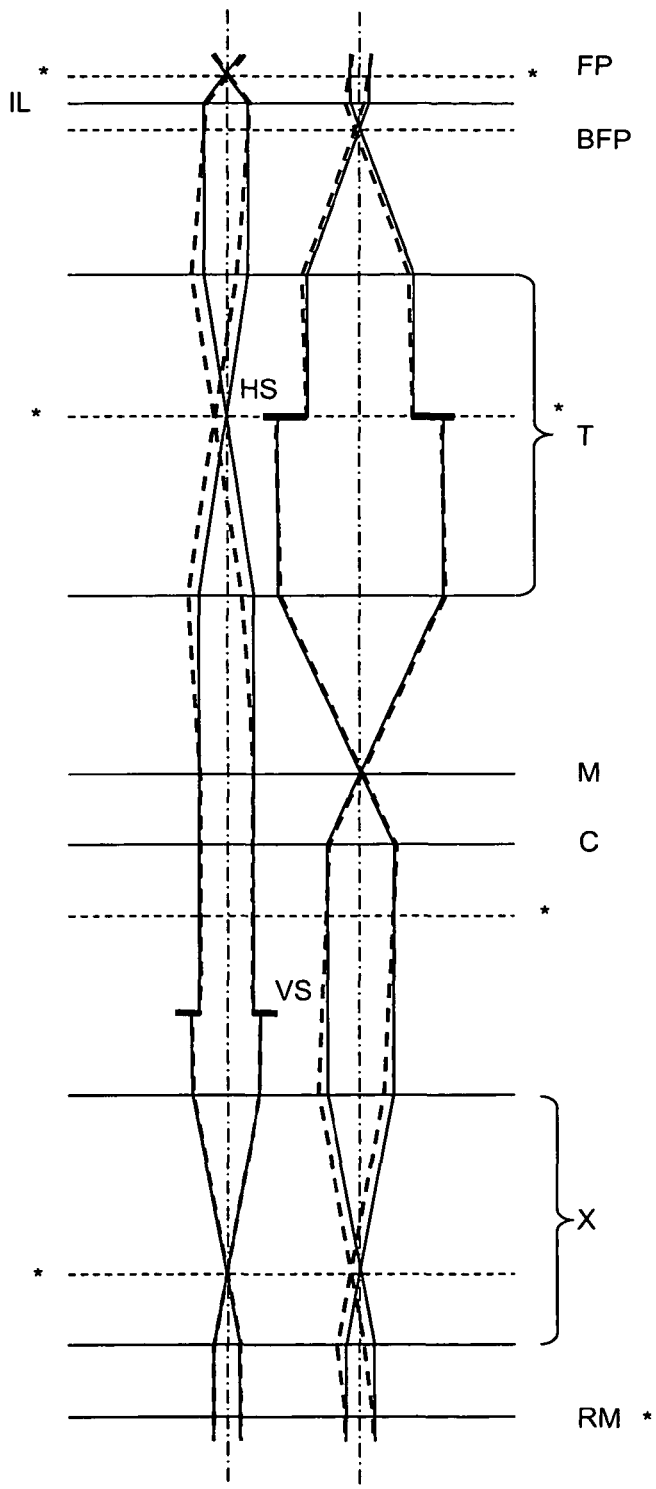
FIG. 12 shows two views of the ray tracing through the optics of FIG. 11.

Returning to FIG. 11, each of the two illumination units 1104, 1106 includes a cylindrical lens (C), mirrors (M), telescope (T) including a horizontal slit (HS), and an illumination lens (IL). The cylindrical lens (C) focuses the light to a horizontal line that is imaged into the back focal plane (BFP) of the illumination lens (IL) by the telescope (T). The horizontal slit (HS) serves to confine the light to form a light sheet within the detector field of view in the sample (S). The light sheet entering the illumination lens (IL) is collimated in y and focused in z. These optical elements in the illumination units produce from the two alternating light beams two respective counter-propagating, coplanar, alternating light sheets. The two light sheets alternately illuminate from opposite directions the field of view in the detector focal plane. The detection unit of the microscope has detection optics including a detection lens (DL) focused on the field of view in focal plane where the specimen (S) is positioned for imaging. The detection unit also includes one or more sets of filter (F), and tube lens (TL). Optionally, one or more additional CCD cameras (CCD2) can be used to capture images of additional wavelength ranges. One or more dichroic mirrors (DC) are used to split the fluorescence onto the different cameras. The detection lens (DL) is preferably a water dipping objective lens for samples embedded in aqueous agarose and immersed in aqueous medium or an air lens for dry samples, as are the illumination lenses (IL1, IL2). The three lenses can be confocally aligned. FIG. 12 shows top and side views of the ray tracing through the optics of FIG. 11, where asterisks (*) represent planes conjugate to the focal plane (FP). Dashed rays indicate a displacement of the beam path from the center of oscillation, while solid rays indicate a non-displaced beam path.

The resonant mirror (RM) in the scan unit oscillates at a controlled frequency to produce a vertically oscillating path of the light beam. The oscillations of the beam in the vertical direction, in turn, causes the propagation direction of the alternating light sheets to pivot in the focal plane. The angle of the pivot is determined by the oscillation phase of the resonant mirror. The oscillation frequency in the preferred embodiment is on the order of 1 kHz, i.e., between 0.1 kHz and 10 kHz. With a typical CCD camera exposure period of 10-30 ms, this oscillation frequency allows the entire range of pivot angles to be cycled through several times during a single image exposure. Preferably, the propagation direction of the light sheet pivots through several degrees in both directions, e.g., in a range from +/−10 degrees. As a result, shadow artifacts are dramatically reduced in each image. In case of a resonant mirror the waveform of its movement is generally sinusoidal which means that the sample is illuminated for an extended period of time from the extreme angles shown in FIGS. 10A and C. A computer controlled scan mirror could also be moved with a triangular wave resulting in a more even distribution of illumination angles. This, however, will not necessarily improve the image quality since the extreme angles are most important to eliminate shadows. The waveform does not need to be very well controlled, thereby eliminating the need for expensive parts.

Preferably, the specimen can be translated in the x, y, or z directions and rotated about y-axis by micromotors (not shown). By changing the position of the specimen, different cross-sectional slices can be positioned in the focal plane for imaging. For example, FIGS. 13A-C show a specimen 1300 being translated to three different positions, respectively, in the z direction relative to illumination optics 1308 and detection optics 1310 to produce three corresponding images 1302, 1304, 1306. The resulting images are recorded to produce an image stack. Images in a given stack are recorded sequentially. FIGS. 14A-C illustrate how illumination from both sides of the sample improves the well-imaged portions of the stacks as compared to the conventional SPIM technique shown in FIGS. 6A-C. As shown in FIG. 14A, illumination of sample 1400 from both sides produces image stacks with both sides of each image 1402 well-illuminated. FIG. 14B illustrates images 1404 in the well-detected stacks that are positioned on the detector-side of the specimen 1400. FIG. 14C shows images 1406 of the well-imaged portion of the specimen 1400, which is twice as large as the quadrant shown in FIG. 6C. Due to this larger well-imaged portion, the image stacks at four different rotational positions 1500, 1502, 1504, 1506 of the specimen have significant overlap, as shown in FIG. 15, as compared to the minimal overlap shown in FIG. 7. Preferably, image stacks are collected at orthogonal rotational orientations. The use of 90-degree rotations is preferred to provide optimal improvement of the limited axial resolution inherent to all single-detection lens microscopes. The superior lateral resolution from one stack compensates for the limited axial resolution from an orthogonal stack, resulting in an isotropic and overall improved resolution. Additional stacks can be taken from more angles to further increase image quality.

In another embodiment, illustrated in FIG. 16, a second detection unit 1612 is included in addition to original detection unit 1610. The additional detection unit is focused on the focal plane and coaxially positioned on the opposite side of the specimen from the first detector. Although it would introduce added complexity and expense, the second detector would allow two sides of the specimen to be well-detected. For example, the additional detector unit could capture an image of the opposite side of the specimen cross-section positioned in the focal plane at the same time that the first detector unit captures its image. This configuration also eliminates the need to rotate the sample by 180 degrees or more, cutting down the recording time by half.

Figure 17:
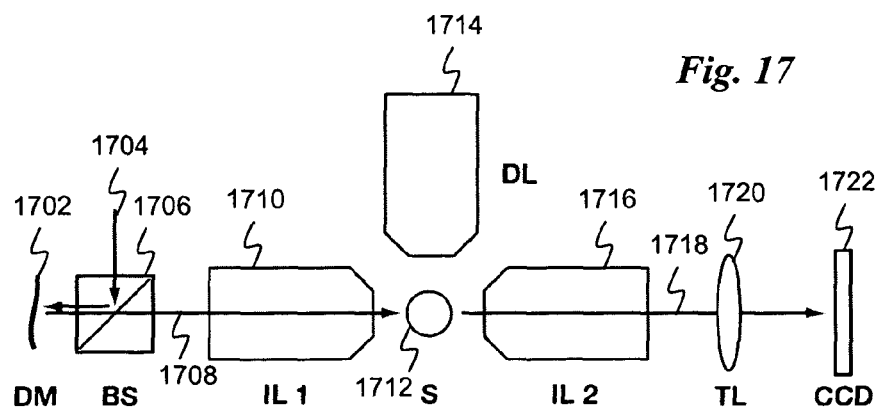
FIG. 17 is a schematic diagram of a device using adaptive mSPIM, according to one embodiment of the invention.

In another aspect, adaptive imaging techniques can be used to improve the imaging of mSPIM further. For example, FIG. 17 is a schematic diagram of a portion of a device using adaptive mSPIM, according to one embodiment of the invention. As with the mSPIM devices described above, the device includes illumination optics 1710 and 1716 aligned on an illumination axis perpendicular to a detection axis aligned with detection optics 1714. A sample 1712 is positioned in focal plane of detection optics 1714. This adaptive mSPIM embodiment, however, also includes deformable mirror 1702 and beam splitter 1706. Moreover, it also includes tube lens 1720 and CCD image detector 1722. Illumination beam 1704 enters beam splitter 1706 and is split. A portion of the beam is reflected off deformable mirror 1702 and back into beam splitter 1706 to produce adaptive illumination beam 1708. After illuminating the sample 1712, the transmitted portion 1718 of adaptive beam 1708 passes through both illumination optics 1716 and lens 1720, and it is then detected by CCD 1722.

The adaptive optics are used to deform the wavefront of the illuminating laser light used to create the illuminating light sheet. The light sheet quality is then monitored using the CCD and opposing objective lens. A feedback system from the CCD to the deformable mirror adjusts the wavefront to yield an optimal light sheet and, consequently, optimal image quality.

In mSPIM two opposing objective lenses are used to illuminate the sample in between these lenses from two sides with sequential light sheet pulses. At a given time only one illumination lens is used to illuminating the sample. Hence, the other illumination lens can be used to collect the light that is transmitted through the sample. Under ideal conditions (no sample, or fully transparent sample) the light sheet that is formed by one lens can be imaged with the other lens onto a CCD camera. Once a sample is placed between the lenses, the light is scattered and the light sheet is perturbed. In this case the light sheet quality can be monitored using the second lens. By introducing an optical element to deform the coherent wavefront of the laser light (e.g., deformable mirror, spatial light modulator, micro-mirror device, liquid crystal device), the light sheet can be adjusted to precompensate for the aberrations introduced by the sample. A feedback system is used to dynamically change the wavefront depending on the readout of the camera behind the second objective lens.

Vellekoop and Mosk ("Phase control algorithms for focusing light through turbid media," Optics Communications (2008) vol. 281 (11) pp. 3071-3080 and "Focusing coherent light through opaque strongly scattering media," Opt Lett (2007) vol. 32 (16) pp. 2309-11) have performed experiments in which a laser beam is shaped to optimally penetrate a scattering sample. In some embodiments, a similar setup can be used in SPIM or mSPIM microscopy to optimize the penetration of a light sheet through scattering tissue. The mSPIM system is especially well suited for this implementation because it already includes the two confocally aligned lenses. In addition to the described mSPIM setup, two adaptive elements and optics to direct the transmitted laser light onto cameras are used. The optimization can be done for all light sheets by adding adaptive elements and detector units in all beam paths.

The adaptive mSPIM technique provides improved selective plane illumination microscopy, e.g., improved image quality in highly scattering and refracting samples like embryos and biological tissue samples.

Currently, in all light sheet microscopy techniques (like mSPIM, SPIM, DLSM, etc.) the light sheet is aligned before the experiment to illuminate the focal plane of the detection lens. This alignment is not changed for individual samples. However, samples differ tremendously in their optical properties. Refraction at the medium-sample interface will divert the light sheet away from the focal plane and result in a blurry image. It is therefore beneficial if the light sheet can be adapted to the specific orientation, refractive index and inhomogeneity of the sample. By dynamically adjusting the light sheet to the sample and the specific plane that is looked at an optimal light sheet can be created to yield the optimal image.

Multi-view image fusion techniques can then be used to construct a three-dimensional representation of the specimen from the image stacks. Images stacks with the specimen at different rotational views are recorded sequentially. Image registration is greatly improved in mSPIM because the large overlapping portions of the specimen in the different views. It should also be emphasized that the alternating illumination from opposite sides reduces the out-of-focus light and, consequently, provides higher quality images than would be provided by simultaneous illumination from opposite sides. In principle, the opposite side could be illuminated by rotating the sample 180 degrees, but the rotation and collecting image stacks at additional angles costs time and decreases the temporal resolution of the reconstructed image.

Multi-view reconstruction and image fusion increases the information about the sample and helps improve imaging in two ways: (1) By imaging the specimen with different translational positions and rotational orientations, parts of the sample that are poorly-imaged or invisible in one view become well-imaged or visible in another view. The fusion of such data sets yields a picture of the sample that shows more parts of the sample than would just a single view. (2) Overlapping areas in images taken from different views can be fused to yield a resolution improvement in the final reconstructed image. Because the axial resolution is generally worse than the lateral resolution, turning the sample and collecting image data of the same region from a different angle will improve the resolution.

To take advantage of multi-view reconstruction and image fusion, the sample can be turned by 90 degrees and imaged at four rotational orientations to achieve a substantial improvement in resolution as compared with one or two orientations. Although additional views beyond four would provide better spatial resolution, the cost of collecting image stacks at additional rotational orientations provides diminishing returns in increased spatial resolution and decreases the temporal resolution. In most cases, four to six views is optimal or nearly optimal.

If one or more additional pairs of illumination units are included, fewer orientational views are needed. For example, the alternate embodiment shown in FIG. 16 includes one additional pair of illumination optics aligned with its optical axis perpendicular to the optical axis of the first pair of illumination optics in the focal plane. The four light sheets shown would illuminate the specimen in sequence, so that only one light sheet illuminates the specimen at any given point in time. The beam path switcher in this case would divide the beam into four sequentially alternating beams. In other embodiments, illumination units may be positioned at even more directions, providing sequential illumination in the focal plane by coplanar light sheets from additional angles of incidence, preferably with their axes of propagation having uniform angular distribution within the focal plane. Those skilled in the art will appreciate that various optical elements and configurations may be employed to provide this sequential illumination from multiple sides. Although the embodiment shown in FIG. 16 includes additional detection optics, in other embodiments, the additional detection optics are not included. Moreover, other embodiments may include the additional detection optics without the additional illumination optics.

The image collection and processing techniques for mSPIM are preferably appropriate adaptations of known image processing techniques used in conventional SPIM. The image collection may involve, for each position of the specimen, detection and fusion of multiple images resulting from multi-directional illumination, resulting in a single image for a given view that has increased well-imaged area and reduced shadow artifacts. However, no image registration is required, since the sample has not been moved laterally. These images then are grouped into image stacks for further multi-view reconstruction/fusion processing.

Multi-view reconstruction/fusion typically has three stages: preprocessing, registration, and fusion. Preprocessing involves axial re-sampling and stack rotation. Known imaging system parameters (e.g., pixel pitch, optical magnification, angle of rotation, spacing of slices in the stacks) are used to transform the images in order to allow simplified registration using only 3D translation. In particular, each stack is resealed axially by bicubic interpolation so that the axial slice spacing is equal to the lateral pixel spacing. The 3D stacks are then rotated using bicubic interpolation so that they share a common orientation. In the registration step, transformations are used to align the preprocessed images so that common features overlap and match. For example, shift vectors for simple translation transformations can be determined by image cross-correlation implemented using a fast Fourier transform. Accurate cross-correlation, however, requires sufficient overlap between images, which can be small for highly opaque specimens. The image fusion stage involves generating a single image representation from the aligned images. This stage may be performed by taking the weighted average of the registered views in Fourier space, where the weighting is by expected signal-to-noise ratio. In addition, multi-view deconvolution (MVD) may be used to further improve the fusion. Software packages such as ImageJ, Matlab and Labview may be used for image analysis and data processing. In addition, many public domain plugins and scripts are available for image manipulation tasks.

The invention claimed is:

1. A selective plane illumination microscope comprising:
    a) a laser unit producing a light beam;
    b) a beam path switcher alternately directing the light beam along two distinct paths producing two alternating light beams;
    c) two illumination units producing from the two alternating light beams two respective counter-propagating, coplanar, alternating light sheets; wherein the two alternating light sheets alternately illuminate the focal plane from opposite directions,
    d) a detection unit focused on a focal plane for detecting images of a cross-section positioned in the focal plane while the cross-section is illumined by the alternating light sheets produced by the two illumination units; wherein the focal plane is coplanar with the alternating light sheets; wherein the detection unit has a detection axis perpendicular to an axis of propagation of the alternating light sheets;
    e) an image processor for producing fused image data from the images of the cross-section positioned in the focal plane detected while the cross-section was illumined by the alternating light sheets produced by the two illumination units, wherein the fused image data represents an image of the cross-section having improved image quality.

2. The selective plane illumination microscope of claim 1 further comprising:
    a scan unit with a resonant mirror producing from the light beam a light beam having an oscillating path, wherein the oscillating path causes a pivot through the focal plane of the alternating light sheets at angles determined by the resonant mirror.

3. The selective plane illumination microscope of claim 2 wherein the angles range over +/−10 degrees.

4. The selective plane illumination microscope of claim 2 wherein the frequency is on the order of 1 kHz.

5. The selective plane illumination microscope of claim 1 wherein the detection unit is synchronized with the beam path switcher.

6. The selective plane illumination microscope of claim 1 further comprising:
    an additional detection unit focused on the focal plane.

7. The selective plane illumination microscope of claim 1 further comprising two additional illumination units; wherein:
    the beam path switcher further alternately directs each of the two alternating light beams to produce four alternately directed light beams along four distinct paths;
    the two additional illumination units, together with the two illumination units produce from the four alternating light beams four respective counter-propagating, coplanar, alternating light sheets.

8. The selective plane illumination microscope of claim 1 wherein at least one of the illumination units comprises adaptive optics, an optical detector, and a feedback system for adapting opposing light beams to improve imaging.

9. A method for selective plane illumination microscopy comprising:
    a) alternately illuminating a focal plane with two counter-propagating, coplanar light sheets;
    wherein the light sheets are coplanar with the focal plane; wherein the focal plane is illuminated by only one light sheet at a time;
    b) detecting by a detection unit multiple images of a specimen cross-section positioned in the focal plane, wherein the detecting is performed during the alternate illumination of the focal plane with the two counter-propagating, coplanar light sheets, wherein each of the multiple images is detected while only one of the coplanar light sheets is illuminating the focal plane; wherein the detection unit has a detection axis perpendicular to an axis of propagation of the light sheets;
    and
    c) image fusion processing the multiple images of the specimen cross-section, wherein the multiple images were detected during the alternate illumination of the focal plane with the two counter-propagating, coplanar light sheets, to produce a reconstructed image representation of the specimen cross-section having improved image quality.

10. The method of claim 9 further comprising pivoting the direction of propagation of the light sheets in the focal plane while detecting the image.

11. The method of claim 10 wherein the pivoting oscillates through +/−10 degrees while detecting the image.

12. The method of claim 10 wherein the pivoting oscillates at a frequency on the order of 1 kHz.

13. The method of claim 9 further comprising alternately illuminating the focal plane with an additional pair of two counter-propagating, coplanar light sheets such that the focal plane is illuminated by only one light sheet at a time.

14. The method of claim 9 further comprising detecting an image of an opposite side of the specimen cross-section positioned in the focal plane while only one of the coplanar light sheets is illuminating the focal plane.

15. The method of claim 9 further comprising adapting the light sheets using feedback from light transmitted through the specimen.

* * * * *